United States Patent
Jeon et al.

(10) Patent No.: US 8,355,103 B2
(45) Date of Patent: Jan. 15, 2013

(54) TN-LCD AND POLARIZER PLATE COMPRISING AN INTEGRATED O FILM HAVING A NEGATIVE BIAXIAL FILM AND A POSITIVE O FILM FOR IMPROVING THE VIEWING ANGLE

(75) Inventors: Byoung-Kun Jeon, Daejeon (KR); Sergey Belyaev, Daejeon (KR); Chang-Hun Yun, Cheonlanam-do (KR); Moon-Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/338,093

(22) Filed: Dec. 27, 2011

(65) Prior Publication Data

US 2012/0194765 A1    Aug. 2, 2012

Related U.S. Application Data

(62) Division of application No. 12/224,551, filed as application No. PCT/KR2007/002733 on Jun. 5, 2007, now Pat. No. 8,107,042.

(30) Foreign Application Priority Data

Jun. 8, 2006  (KR) .......................... 10-2006-0051636

(51) Int. Cl.
*G02F 1/1335*  (2006.01)
*G02F 1/1337*  (2006.01)

(52) U.S. Cl. ......................... 349/120; 349/124; 349/125

(58) Field of Classification Search .......... 349/117–121, 349/123–126
See application file for complete search history.

(56) References Cited

U.S. PATENT DOCUMENTS

| 5,619,352 | A | 4/1997 | Koch et al. |
|---|---|---|---|
| 5,736,066 | A | 4/1998 | Noguchi et al. |
| 5,976,640 | A | 11/1999 | Yu et al. |
| 6,903,789 | B1 | 6/2005 | Cutler et al. |
| 2002/0041352 | A1 | 4/2002 | Kuzuhara et al. |
| 2003/0193636 | A1 | 10/2003 | Allen et al. |
| 2004/0080691 | A1 | 4/2004 | Mi et al. |
| 2004/0156106 | A1 | 8/2004 | Allen et al. |
| 2005/0219447 | A1 | 10/2005 | Slaney et al. |
| 2007/0024792 | A1* | 2/2007 | Chang et al. ................ 349/141 |

FOREIGN PATENT DOCUMENTS

| JP | 10-251513 A | 9/1998 |
|---|---|---|
| JP | 2001-200018 A | 7/2001 |
| JP | 2002-69180 A | 3/2002 |
| JP | 2002-236216 A | 8/2002 |
| JP | 2004-271695 A | 9/2004 |
| JP | 2005-292727 A | 10/2005 |

(Continued)

*Primary Examiner* — Mark Robinson
*Assistant Examiner* — Paul Lee
(74) *Attorney, Agent, or Firm* — McKenna Long & Aldridge, LLP (57) ABSTRACT

Disclosed herein are an integrated O film for improving a viewing angle of a TN-LCD, and a polarizer plate and TN-LCD including the same. Also disclosed herein are a compensation film which is capable of improving a contrast characteristic at a front side and an inclination angle and minimizing a color variation according to a viewing angle in a dark state, and a polarizer plate and TN-LCD including the same. The integrated O film includes a transversely-stretched negative biaxial (B) film and a positive O film laminated on the transversely-stretched negative B film.

6 Claims, 9 Drawing Sheets

FOREIGN PATENT DOCUMENTS

| | | |
|---|---|---|
| JP | 2005-292732 A | 10/2005 |
| KR | 2002-0041433 | 6/2002 |
| KR | 10-0376378 | 3/2003 |
| WO | WO 96/01070 | 4/1996 |
| WO | WO 03/034102 A2 | 4/2003 |
| WO | WO 2004/042461 A1 | 5/2004 |

* cited by examiner (a)

FIG. 9 ically wasted.
TN-LCD AND POLARIZER PLATE COMPRISING AN INTEGRATED O FILM HAVING A NEGATIVE BIAXIAL FILM AND A POSITIVE O FILM FOR IMPROVING THE VIEWING ANGLE This application is a Divisional of prior application Ser. No. 12/224,551, filed Aug. 29, 2008, now U.S. Pat. No. 8,107, 042 which claims the benefit of PCT/KR2007/002733, filed on Jun. 5, 2007 and also Korean Patent Application No. 10-2006-0051636, filed on Jun. 8, 2006, which are hereby incorporated by reference in their entirety as if fully set forth herein.

TECHNICAL FIELD

The present invention relates to an integrated O film for improving a viewing angle of a twisted nematic liquid crystal display (TN-LCD), and a polarizer plate and a TN-LCD including the same, and more particularly, a compensation film, which is capable of improving a contrast characteristic at a front side and an inclination angle and minimizing a color variation according to a viewing angle in a dark state, and a polarizer plate and a TN-LCD including the same.

BACKGROUND ART

A liquid crystal display (LCD) is a display device for implementing a desired image by selectively transmitting light emitted from a backlight using a polarization phenomenon of liquid crystal.

Figure 1:
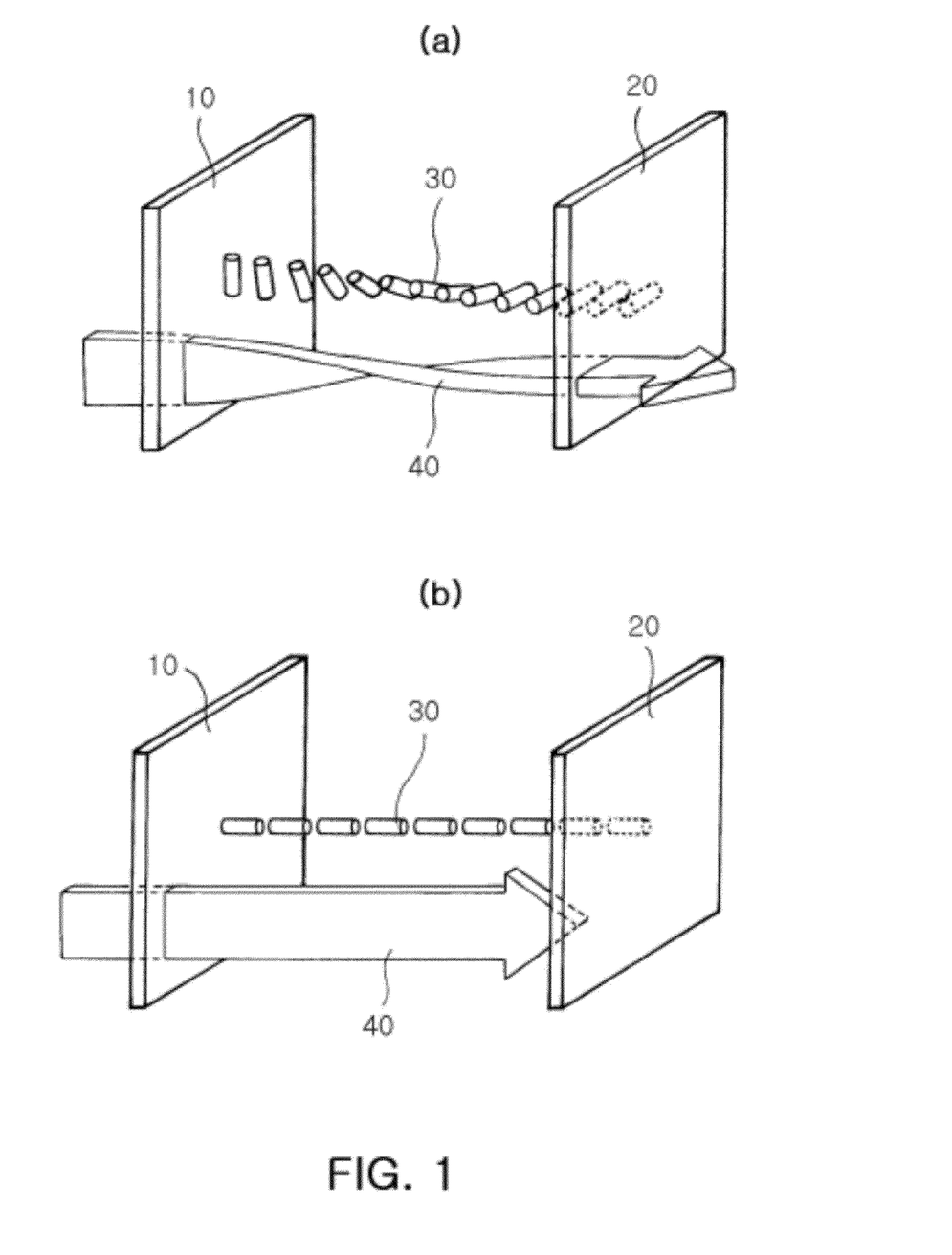
FIGS. 1A and 1B respectively are views showing a bright state and a dark state of a TN-LCD.

FIG. 1 shows a phenomenon for selectively transmitting light in a TN-LCD used widely. As shown in FIG. 1A, an angle between the polarization axes between a light source side polarizer plate 10 and a viewer side polarizer plate 20 is 90°. Nematic liquid crystal molecules 30 are filled between the two polarizer plates and the liquid crystal molecules 30, which are close to the polarizer plates, are aligned in the same directions as the polarization axes of the polarizer plates. Accordingly, the alignment directions of the liquid crystal molecules which are close to the two polarizer plates are orthogonal to each other, similar to the polarizer plates. In addition, the liquid crystal molecules in a middle portion are twisted as shown in the drawing.

Accordingly, light 40 polarized by the light source side polarizer plate rotates by 90° by the nematic liquid crystal molecules and, as a result, passes through the viewer side polarizer plate.

However, when an electrical field is applied to the liquid crystal molecules 30, the liquid crystal molecules 30 are arranged parallel to the direction of the electrical field as shown in FIG. 1b. Accordingly, the light 40 which passes through the light source side polarizer plate 10 does not rotate and reaches the viewer side polarizer plate 20 in the direction polarized by the light source side polarizer plate such that the light does not transmit through the viewer side polarizer plate 20 which rotates by 90° with respect to the light source side polarizer plate 10.

The LCD controls the transmission and blocking of the light by selectively applying the electrical field to each pixel using the above-described phenomenon.

In the LCD, the contrast characteristic is improved when the light is surely transmitted and blocked such that a bright state and a dark state appear. In particular, when light leakage is minimized in the dark state, it is possible to improve the contrast characteristic. No problem is caused in the contrast characteristic when a display device is viewed from the front side, but the light leakage is unlikely to be perfectly prevented in the dark state when the display device is viewed at an inclination angle. As described above, in the LCD, the light is blocked by providing a polarizer plate having a transmission axis perpendicular to the light polarized linearly at the viewer side using a polarization phenomenon. However, when the light which reaches the viewer side polarizer plate is not perfectly linearly polarized, a portion of the light may be leaked.

Such a phenomenon may occur when the light travels in an inclination direction (in the viewer's direction), not in a vertical direction. That is, the dark state is perfectly implemented when the nematic liquid crystal molecules are aligned parallel to the traveling direction of the light as shown in FIG. 1b. Accordingly, since the alignment direction of the liquid crystal molecules and the traveling direction of the light are not perfectly parallel to each other when the light travels in the inclination direction, an additional phase variation occurs and thus the light is not perfectly blocked.

Figure 2:
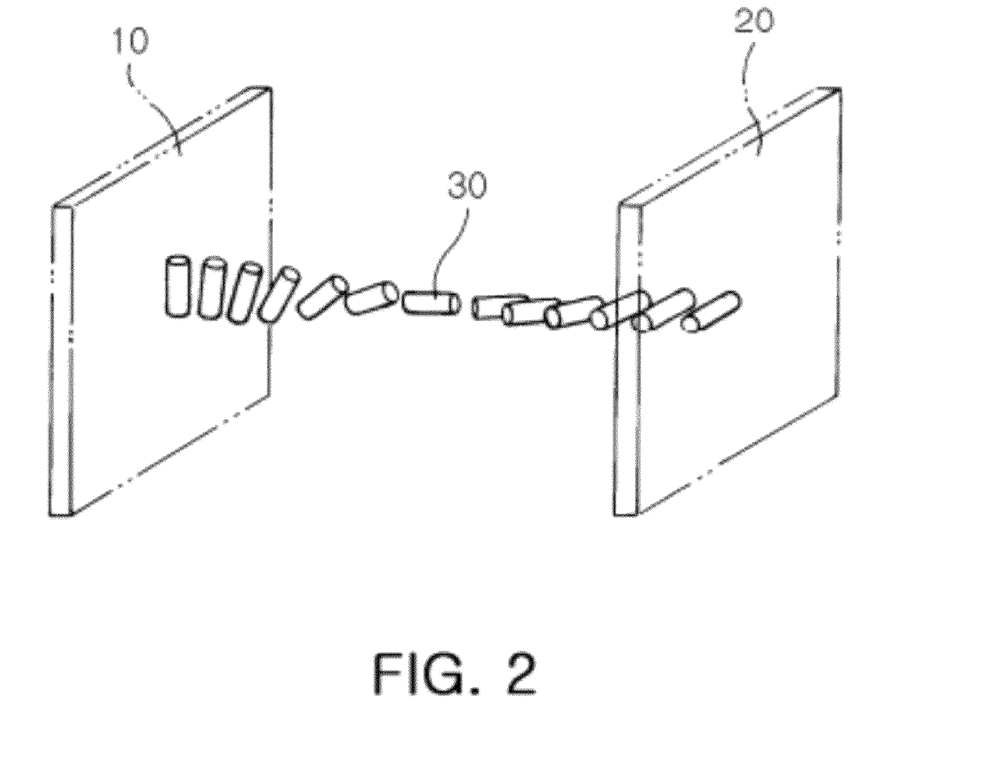
FIG. 2 is a schematic view showing the splay alignment of liquid crystal molecules when an electrical field is applied to a TN-LCD.

Another reason why the light leakage occurs in the dark state is because the liquid crystal molecules are aligned in a horizontal direction equal to the orientation of an alignment film, not parallel to the direction of the electrical field, in the boundary between the alignment film and the liquid crystal (that is, the polarizer plate side), and become aligned parallel to the direction of the electrical field as getting away from the boundary between the alignment film and the liquid crystal, as shown in FIG. 2. Accordingly, there is caused a so-called splay alignment that the inclination angles of the liquid crystal molecules gradually increase to be close to 90 from the boundary between the alignment film and the liquid crystal to the center of the liquid crystal layer.

The light may not be perfectly blocked in the dark state by the splay alignment of the liquid crystal layer.

Conventionally, a variety of technologies were suggested in order to prevent the light leakage. For example, Korean Patent Publication No. 10-0376378 discloses the technology of improving the gray-scale characteristic and reducing light leakage using an O film. In this technology, variations in light leakage amount among gray scales according to viewing angles are minimized by an O-plate compensator having an inclination angle. In this technology, since light leakage amount can be properly controlled according to the viewing angles, it is possible to manufacture a LCD having a high gray-scale characteristic regardless of the viewing angle.

However, in this technology, since the O film is directly formed on a glass substrate, productivity deteriorates. That is, in order to manufacture the O-plate compensator, a low pretilt alignment layer and high pretilt alignment layer are formed on the glass substrate. In this case, it takes much time to perform the process of forming the layers on the glass substrate and it is difficult to manage the substrate.

In addition, in the conventional method, light leakage which occurs by the splay alignment of the liquid crystal molecules can be reduced. However, the light leakage due to the +C alignment of liquid crystal molecules (that is, since the liquid crystal molecules are aligned parallel to the direction of the electrical field, the light can be prevented from leaking to the front side. However, when the light travels in an inclination direction, a retardation occurs and thus a perfect dark state cannot appear) is unlikely to be reduced.

When light reaches the polarizer plate at an inclination angle, a slight phase retardation occurs in the polarizer plate, thereby causing light leakage. However, in the Korean Patent Publication No. 10-0376378, it is difficult to perfectly prevent light from leaking due to such various causes.

DISCLOSURE OF INVENTION

Technical Problem

The present invention has been made to solve the foregoing problems of the prior art and therefore an aspect of the present invention is to provide an integrated O film for improving a viewing angle of a TN-LCD having a improved contrast characteristic, gray-scale characteristic or color characteristic by blocking various kinds of factors for causing light leakage, and a polarizer plate and a TN-LCD including the same.

Technical Solution

According to an aspect of the present invention, there is provided an integrated O film comprising a transversely-stretched negative biaxial (B) film, and a positive O film laminated on the transversely-stretched negative B film.

According to another aspect of the present invention, there is provided a polarizer plate comprising: a polarization film; and an integrated O film laminated on the polarization film, wherein the integrated O film includes a transversely-stretched negative biaxial (B) film and a positive O film laminated on the transversely-stretched negative B film, and wherein in-plane optical axes of the polarization film and the transversely-stretched negative B film are orthogonal to each other.

According to another aspect of the present invention, there is provided a twisted nematic liquid crystal display (TN-LCD) comprising: a pair of glass plates which face each other; twisted nematic liquid crystal filled between the glass plates; polarizer plates attached to the outsides of the glass plates, wherein each of the polarizer plates include a polarization film and an integrated O film laminated on the polarization film, wherein the integrated O film includes a transversely-stretched negative biaxial (B) film and a positive O film laminated on the transversely-stretched negative B film.

The value $N_z$ of the negative B film expressed by Equation 1 may be 0.1 to 2.

$$N_z = \left|\left(\frac{n_z - n_y}{n_x - n_y}\right)\right| \qquad \text{Equation 1}$$

where, $n_x$, $n_y$, and $n_z$ denote refractive indexes of x, y and z directions, respectively.

The thickness retardation value of the negative film may be −50 to −150 nm.

More preferably, the value $N_z$ of the negative B film may be 0.3 to 1.

An average tilt angle of the positive O film expressed by Equation 2 may be 30° to 50° and a maximum value of the tilt angle may be 50° to 90°.

$$\theta_{average} = \frac{\int_0^d \theta(z)dz}{d} \qquad \text{Equation 2}$$

where, d denotes a thickness of the film and $\theta(z)$ denotes a tilt angle of the film in a vertical position z.

An in-plane retardation value of the positive O film may be 50 to 150 nm.

The positive O film may include nematic liquid crystal.

An alignment film interposed between the negative B film and the positive O film may be further included.

The alignment film may be an acrylic-based alignment film.

The alignment film may be an optical alignment film having an alignment characteristic by irradiation of polarized ultraviolet rays.

The alignment film may include polynorbornene cinnamate or polyimide cinnamate.

Advantageous Effects

As described above, an integrated O film according to the present invention is manufactured by laminating a positive O film and a negative B film under an optimal condition. Accordingly, it is possible to prevent light leakage in all directions and to manufacture a TN-LCD capable of improving a contrast characteristic, gray scale characteristic and color characteristic by using the integrated O film according to the present invention.

BRIEF DESCRIPTION OF THE DRAWINGS

The above and other aspects, features and other advantages of the present invention will be more clearly understood from the following detailed description taken in conjunction with the accompanying drawings, in which.

BEST MODE FOR CARRYING OUT THE INVENTION

Hereinafter, the present invention will be described in detail.

As described above, light leakage occurs because light polarized by a light source side polarizer plate is subjected to a retardation before reaching a viewer side polarizer plate and thus the light cannot reach the viewer side polarizer plate in a perfectly linearly polarized state vertical to a transmission axis of the viewer side polarizer plate.

The retardation for causing light leakage is classified into three types as follows:

1) A retardation which occurs when a TN-LCD is vertically erected, a viewing angle is not parallel to the alignment direction of the liquid crystal molecules, and thus light travels at the viewing angle, 2) A retardation which occurs by a splay alignment portion of a TN-LCD (liquid crystal molecules in a portion close to an alignment film or in a gray state may be aligned in a splay alignment manner), and 3) A retardation which occurs when light obliquely enters a polarizer plate.

Accordingly, in order to prevent light from leaking, all the above-described retardations must be compensated.

The inventors of the present invention carry out research on such problems and confirm that all the retardations which occur in various patterns can be compensated when a positive O film and a negative biaxial (B) film are arranged under an adequate condition. Hereinafter, an integrated O film refers to a lamination of a positive O film and a negative B film, and an O film refers to an O film layer.

Among the films, the O film is to compensate a retardation which occurs (that is, a retardation which occurs due to a splay alignment) when, since an electrical field is applied to liquid crystal molecules, the liquid crystal molecules are not vertically aligned in the boundary between an alignment film and the liquid crystal, that is, are aligned parallel to the alignment direction of the alignment film, and the liquid crystal molecules become gradually more tilted in the direction of the electrical field.

Figure 3:
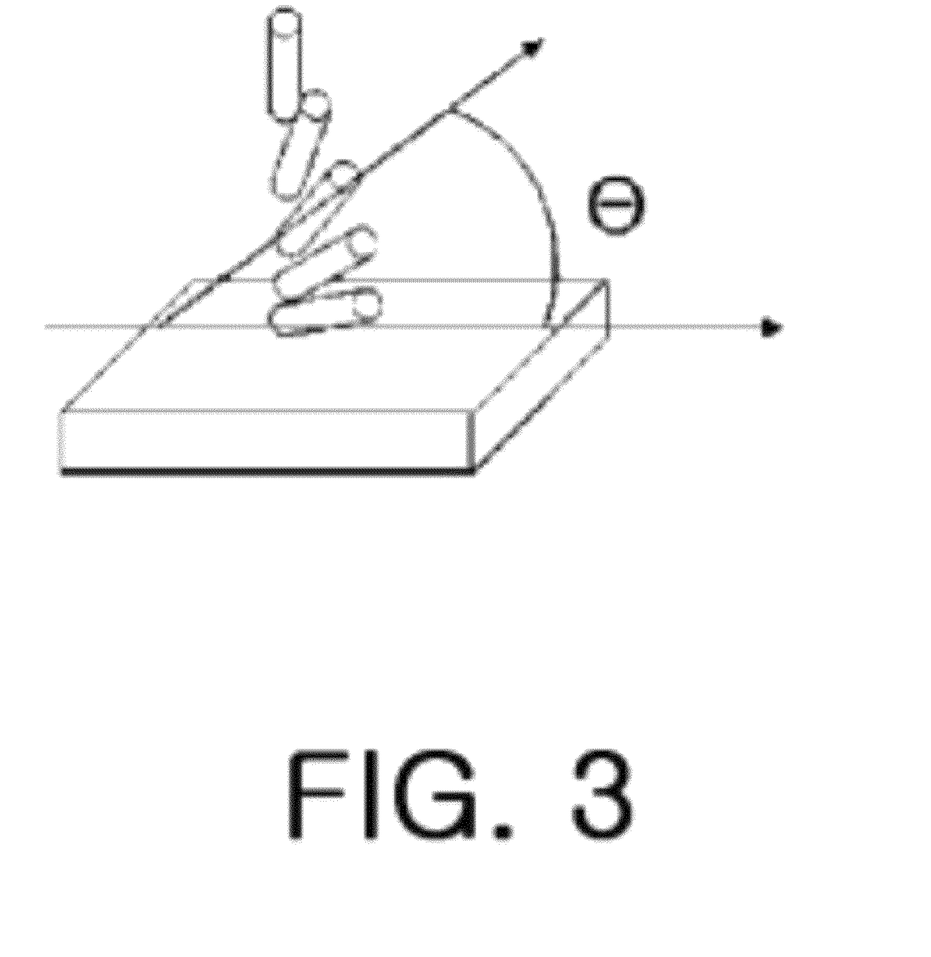
FIG. 3 is a schematic view showing the splay alignment state of a positive O film.

As shown in FIG. 3, the molecules of the O film are preferably splay-aligned. In the splay alignment of the molecules of the O film, an average tilt angle $\theta_{average}$ defined by Equation 3 is in a range of 30° to 50° and a maximum tilt angle is preferably in a range of 50° to 90° and more preferably in a range of 60° to 90°.

$$\theta_{average} = \frac{\int_0^d \theta(z)dz}{d} \quad \text{Equation 3}$$

where, d denotes the thickness of the film and $\theta(z)$ denotes a tilt angle at a vertical position z in the film.

At this time, the O film is preferably formed of nematic liquid crystal. That is, the O film is formed of liquid crystal, for the splay or oblique alignment. When the O film is formed of discotic liquid crystal, an optical axis separation angle occurs. The optical axis separation angle indicates an angle between the alignment direction of the liquid crystal molecules and a rubbing direction for aligning the liquid crystal molecules. When the optical axis separation angle occurs, front contrast ratio and color characteristic deteriorate. That is, when the optical axis separation angle occurs, light leakage occurs at the front side and more particularly blue light leakage significantly increases. Accordingly, a front color becomes blue and the contrast deteriorates. In order to prevent contrast and color failures due to the optical axis separation angle, the optical axis separation angle should be managed within ±0.5°. However, since the discotic liquid crystal molecule has a coin shape and is symmetrical with respect to all directions, the discotic liquid crystal molecules are unlikely to be aligned in a uniform direction and thus are not suitable for managing the optical axis separation angle. In contrast, since the nematic liquid crystal molecule has a rod shape, the nematic liquid crystal molecules are easily aligned in a rubbing direction and are suitable for managing the optical axis separation angle. Thus, the nematic liquid crystal is preferably used.

The negative B film is an anisotropic film having the following relationship when the refractive indexes of x, y, and z directions are respectively $n_x$, $n_y$, and $n_z$.

$$n_x \neq n_y > n_z \quad \text{Equation 4}$$

The negative B film respectively has optical axes in a direction c (vertical to the surface of the film) and a direction c (parallel to the surface of the film) and performs a function similar to that of a negative C plate by the optical axis component of the direction c. Accordingly, a retardation which occurs by a positive C plate formed of liquid crystal by emitting light at an inclination angle is cancelled by a negative C plate.

The direction a, which is the other optical axis of the negative B film, serves to cancel a retardation which may occur when light enters the polarizer plate at an inclination angle.

The negative B film may be preferably a transversely-stretched film. As the transversely-stretched film, a biaxially stretched cyclo-olefin polymer (COP) film, a biaxially stretched polycarbonate (PC) film, a uniaxially stretched triacetate cellulose (TAC) and poly norbornene film may be used. A biaxial liquid crystal may also be used.

Accordingly, the positive O film and the negative B film serve to cancel the three retardations. However, the positive O film and the negative B film must be used by the following proper combination such that the effect of the present invention can be obtained.

A lamination of the O film and the B film is used. In the lamination, the optical axis of the O film and the optical axis (optical axis parallel to the surface of the film out of the two optical axes) of the B film need to be orthogonal to each other.

In the lamination, the O film and the B film have adequate retardation values in order to cancel the retardation effect due to the inclination angle.

That is, each film has an in-plane retardation value according to Equation 5 and a thickness retardation value according to Equation 6, all of which are in respective adequate ranges. In Equations, d denotes the thickness of the film and $n_x$, $n_y$, and $n_z$ denote the refractive indexes of x, y, and z directions.

$$\text{In-plane retardation value } (R_{in}) = d \times (n_x - n_y) \quad \text{Equation 5}$$

$$\text{Thickness retardation value } (R_{th}) = d \times (n_z - n_y) \quad \text{Equation 6}$$

The present inventors obtained the researched result that the in-plane retardation value $R_{in}$ of the B film for preventing light leakage when light reaches the polarizer plate at the inclination angle should be 150 to 250 nm. If the in-plane retardation value is less than 150 nm, the light leakage significantly increases and thus a contrast ratio decreases. In contrast, if in-plane retardation value is greater than 250 nm, the color of the dark state unpreferably varies.

If the in-plane retardation value of the B film is in the above-described range, a value $N_z$ expressed by Equation 7 is preferably in a range of 0.1 to 2 in order to further improve the contrast ratio. If the value $N_z$ is less than 0.1, the contrast ratio decreases. In contrast, if the value $N_z$ is greater than 2, a variation in color of the dark state un-preferably increases. It is more preferable that the value $N_z$ is in a range of 0.3 to 1.

$$N_z = \left| \left( \frac{n_z - n_y}{n_x - n_y} \right) \right| \quad \text{Equation 7}$$

Equation 7 indicates a ratio of the thickness retardation value $R_{th}$ to the in-plane retardation value $R_{in}$. Accordingly, since the preferable range of the in-plane retardation value $R_{in}$ is previously obtained, the range of the thickness retardation value can be obtained by Equation 5.

The thickness retardation value of the B film for further improving a contrast ratio while satisfying Equation 7 is −50 to −150 nm.

The integrated O film is formed by laminating the O film on the B film. The retardation value of the O film should be determined in consideration of the retardation value of the B film. According to the researched result of the present inventors, it is preferable that the proper in-plane retardation value of the O film is 50 to 150 nm and the thickness retardation value is 50 to 150 nm.

The various retardations can be cancelled by the combination of the positive O film and the negative B film. Accordingly, a good contrast characteristic, color characteristic and gray scale characteristic can be obtained in a wide viewing angle.

In the integrated O film, an alignment film may be further formed on the B film base in order to align the O film on the B film in a necessary direction. At this time, the alignment film is preferably an acrylic-based alignment film, for example, an alignment film including a mixture of penta acrylate and modified poly vinyl alcohol (PVA). Instead of the acrylic-based alignment film, an optical alignment film having an alignment characteristic by irradiation of polarized ultraviolet rays may be used as the alignment film. The example of the optical alignment film may include polynorbornene cinnamate or polyimide cinnamate.

The present invention provides a polarizer plate and a TN-LCD including the integrated O film including the O film and the B film.

In the polarizer plate, the polarization film, the B film and the O film are laminated in this order, or the polarization film, the O film and the B film are laminated in this order (That is, the integrated O film is laminated on the polarization film). The B film is laminated such that the in-plane optical axis of the B film is orthogonal to the absorption axis of the polarizer plate. The O film is laminated such that the optical axis of the O film is orthogonal to the in-plane optical axis of the B film.

Integrated O films laminated on polarizer plates may have the characteristic of the integrated O film according to the present invention.

The present invention also provides a TN-LCD including a pair of glass plates which face each other, twisted nematic liquid crystal filled between the glass plates, and polarizer plates attached to the outsides of the glass plates. That is, the TN-LCD according to the present invention includes the polarizer plate, the glass plate, the liquid crystal, the glass plate and the polarizer plate, all of which are arranged in this order. The TN-LCD according to the present invention includes the polarizer plate having the characteristic of the above-described lamination.

Accordingly, the integrated O film which is the lamination included in the polarizer plate includes all the characteristics of the integrated O film according to the present invention.

When the above-described TN-LCD is used, it is possible to minimize light leakage due to the retardation compensation effect of the integrated O film.

MODE FOR THE INVENTION

Embodiment 1

A LCD having a dielectric anisotropy of $\Delta \in > 0$ and refractive indexes of liquid crystal of $n_e=1.595$ and $n_o=1.5$ and including an LCD panel having a thickness of 4.80 and a compensation film was manufactured. A polarization film is aligned at an angle of 45° with horizontal direction of LCD Panel and the absorption axis of the polarization film is parallel to the optical axis of the LCD panel. An integrated O film was interposed between the LCD panel and the polarization film.

The integrated O film was manufactured by coating a negative B film with a splay-aligned liquid crystal film (O film). The optical axis of the O film was orthogonal to that of the B film. The absorption axis of the polarization film was parallel to the optical axis of the O film and the absorption axis of the polarization film was orthogonal to the optical axis of the negative B film.

A counter polarization film was provided on the outside of the LCD panel. The absorption axis of the counter polarization film was aligned at an angle of 135° with horizontal direction of LCD Panel and an integrated O film was interposed between the LCD panel and the counter polarization film. The absorption axis of the counter polarization film was parallel to the optical axis of the O film and was orthogonal to the optical axis of the negative B film, similar to the above-descried polarization film.

The O film included in the integrated film has an in-plane retardation value of $R_{in}=60$ nm and is formed of nematic liquid crystal. In the splay alignment of the O film, an average tilt angle expressed by Equation 3 was 45°. The in-plane retardation value of the negative B film is $R_{in}=190$ nm and the thickness retardation value thereof is $R_{th}=-100$ nm.

Figure 4:
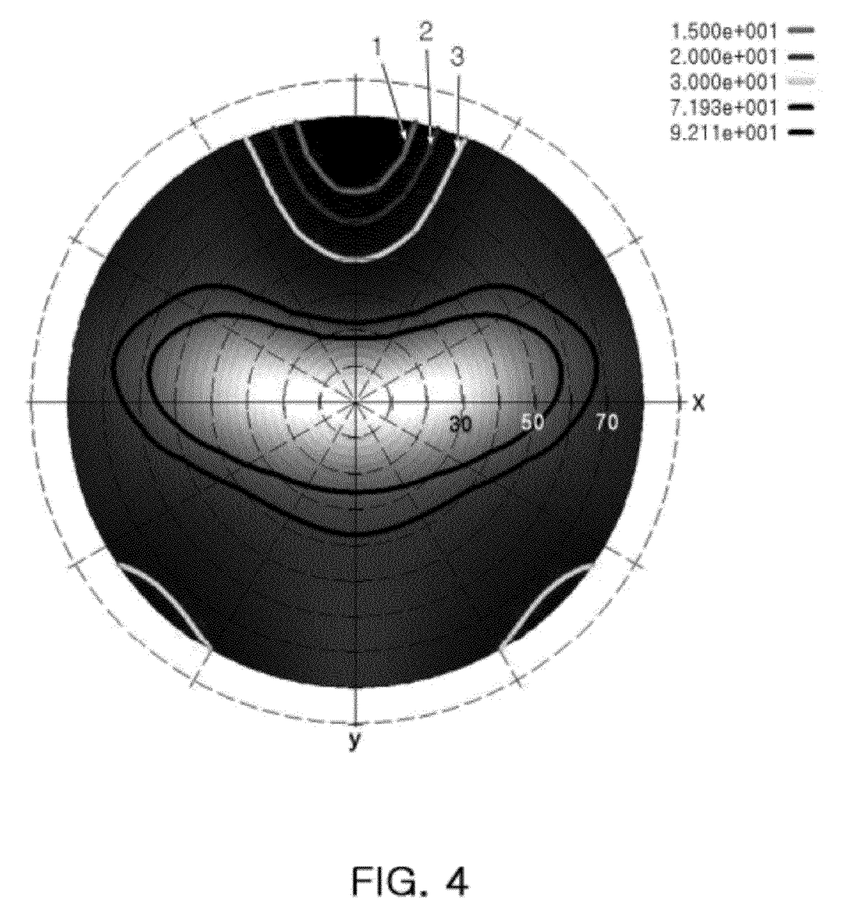
FIG. 4 is a graph showing a contrast characteristic distribution of a TN-LCD according to Embodiment 1 of the present invention.
Figure 5:
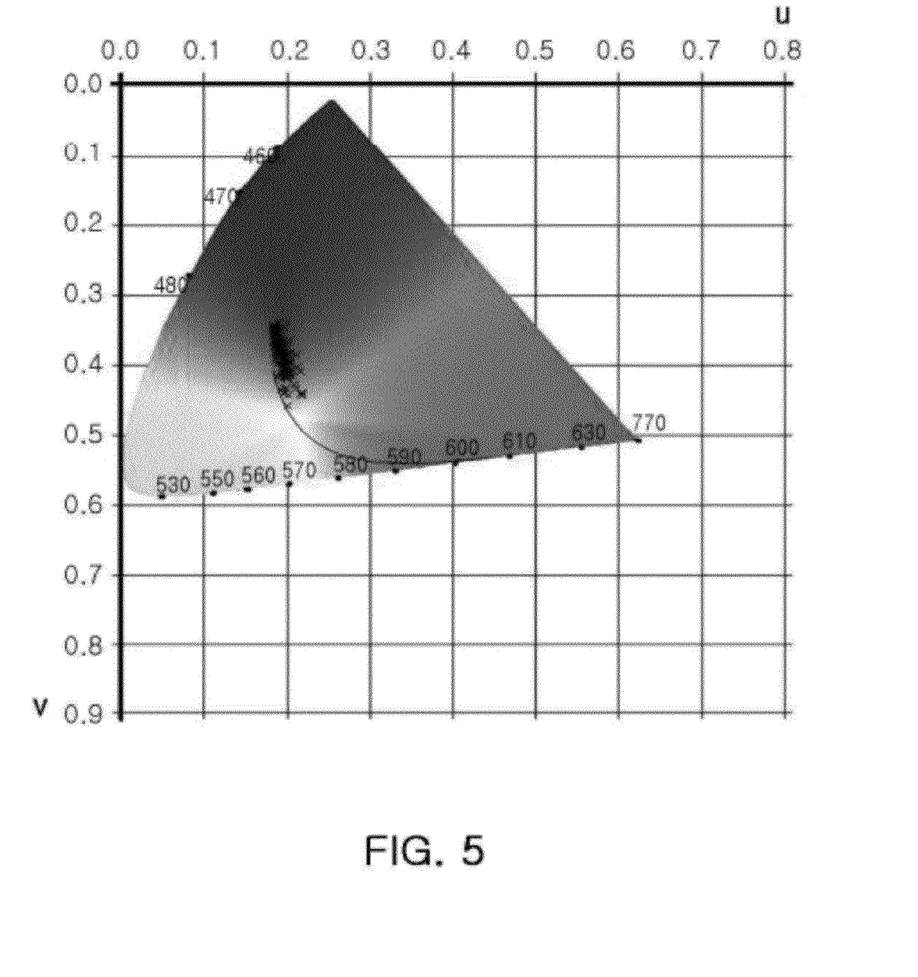
FIG. 5 is a graph showing a color characteristic distribution of the TN-LCD according to Embodiment 1 of the present invention.

The contrast characteristic is shown in FIG. 4 and the color characteristic is shown in FIG. 5. In the drawings, line 1 indicates a boundary of an area having a contrast ratio of above 15:1, line 2 indicates an area having a contrast ratio of above 20:1, and line 3 indicates an area having a contrast ratio of above 30:1. From the drawings, it can be seen that the area having the contrast ratio of above 15:1 is widely distributed and a variation in color characteristic is $\Delta u < 0.015$ and $\Delta v < 0.15$, that is, is very small.

Embodiment 2

A TN-LCD of Embodiment 2 is similar to that of Embodiment 1 except that the in-plane retardation value of the B film included in the integrated O film is 180 nm and the thickness retardation value thereof is 100 nm. The optical characteristic and the color characteristic of the TN-LCD of Embodiment 2 were evaluated.

Figure 6:
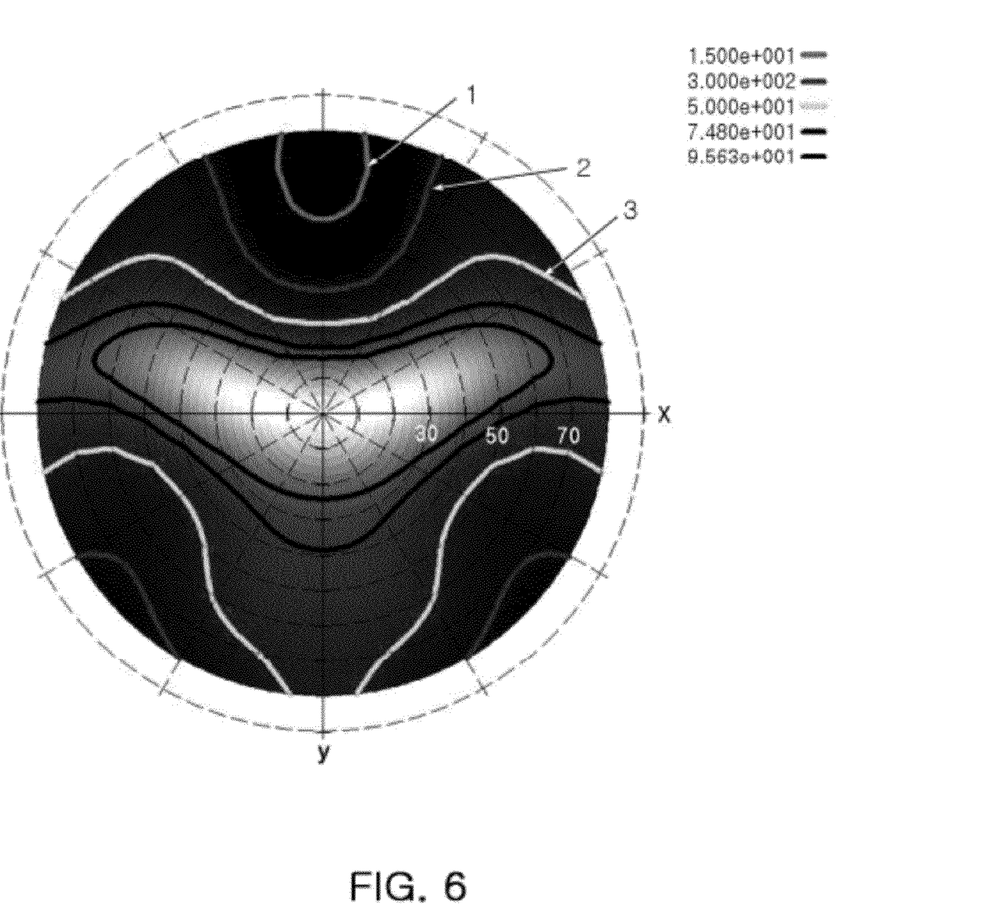
FIG. 6 is a graph showing a contrast characteristic distribution of a TN-LCD according to Embodiment 2 of the present invention.
Figure 7:
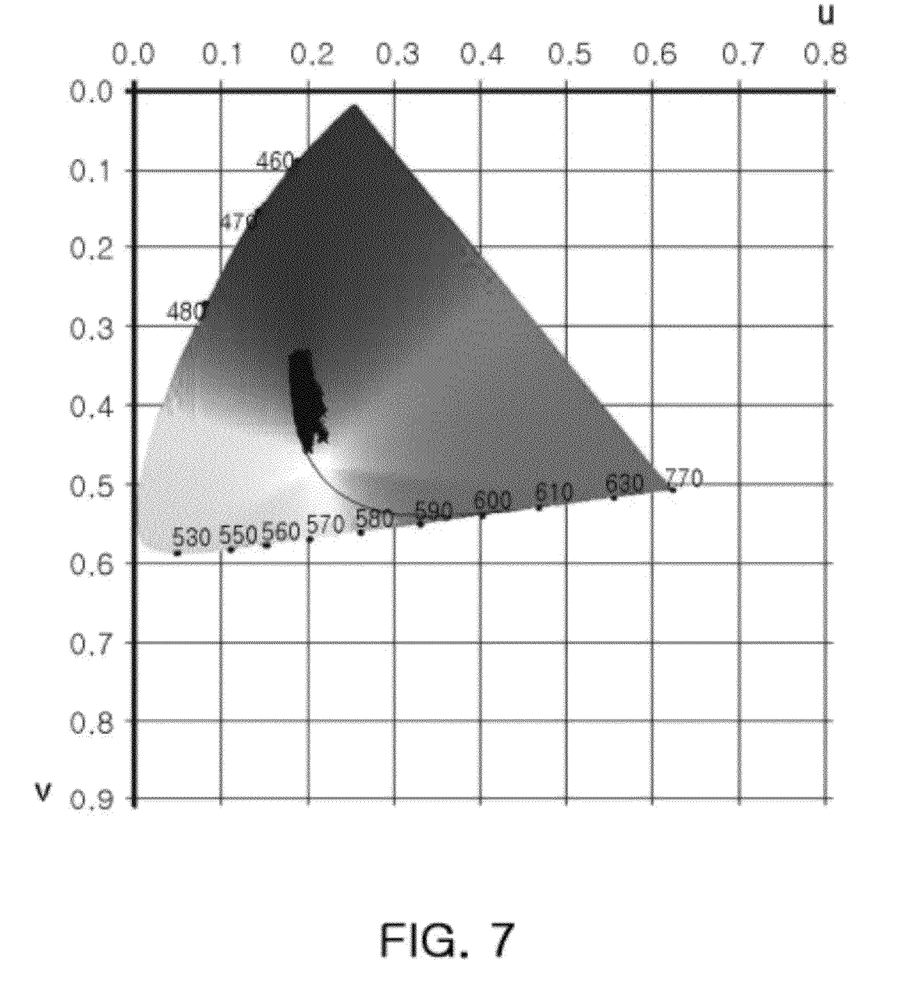
FIG. 7 is a graph showing a color characteristic distribution of the TN-LCD according to Embodiment 2 of the present invention.

The contrast characteristic is shown in FIG. 6 and the color characteristic is shown in FIG. 7. In the drawings, line 1 indicates a boundary of an area having a contrast ratio of above 15:1, line 2 indicates an area having a contrast ratio of above 20:1, and line 3 indicates an area having a contrast ratio of above 30:1. From the drawings, it can be seen that the area having the contrast ratio of above 15:1 is widely distributed and a variation in color characteristic is slightly larger than that of Embodiment 1, but is very small.

Comparative Example 1

A TN-LCD of Comparative Example 1 is similar to that of Embodiment 1 except that WV-EA compensation film (made by Fuji Photo Film Co., Ltd) is used as a compensation film. The optical characteristic and the color characteristic of the TN-LCD of Comparative Example 1 were evaluated.

Figure 8:
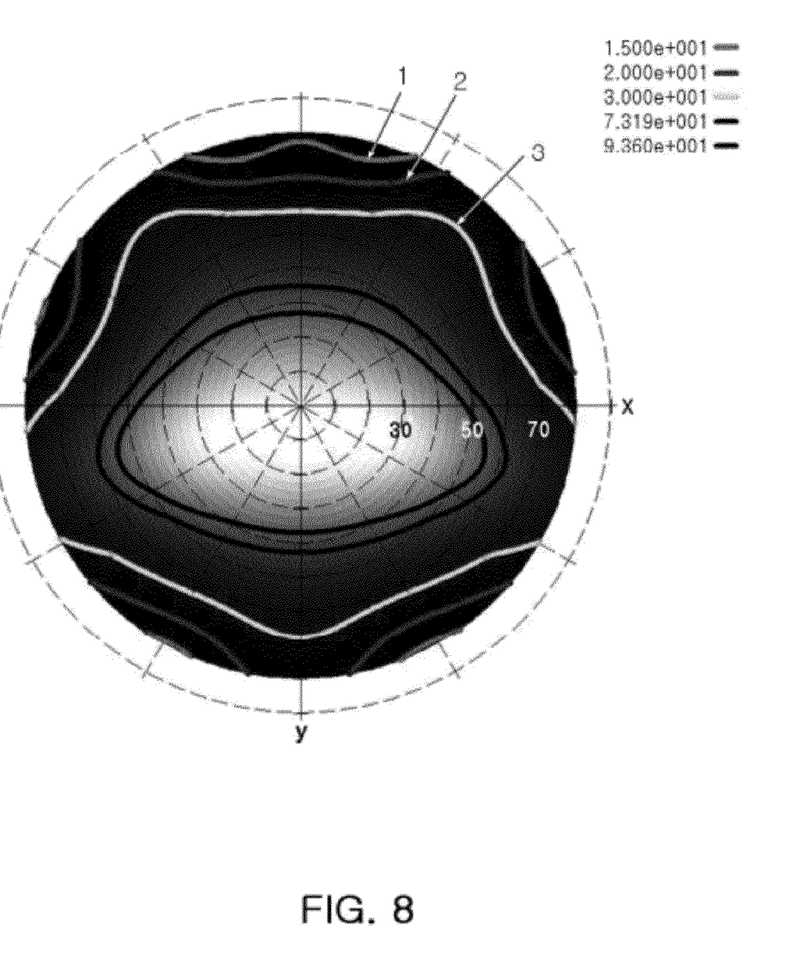
FIG. 8 is a graph showing a contrast characteristic distribution of a TN-LCD including a negative O film, for the purpose of comparison with the present invention.
Figure 9:
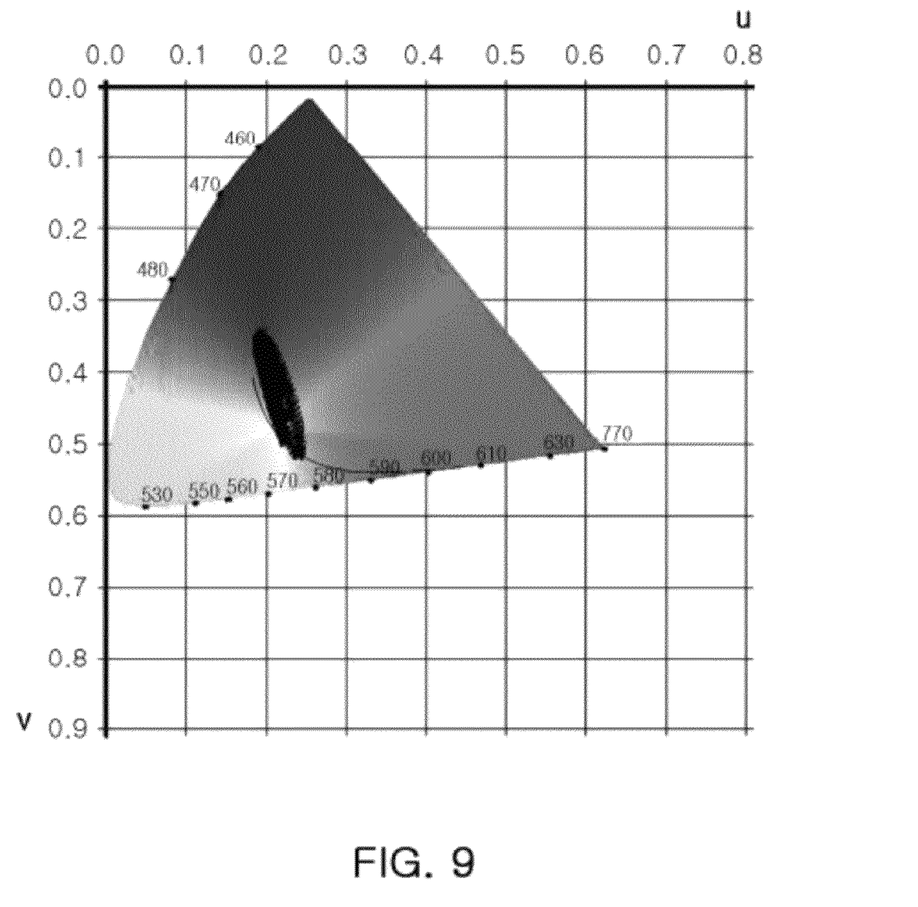
FIG. 9 is a graph showing a color characteristic distribution of a TN-LCD including a negative O film, for the purpose of comparison with the present invention.

The contrast characteristic is shown in FIG. 8 and the color characteristic is shown in FIG. 9. As can be seen from the FIG. 8, the compensation film manufactured by Comparative example 1 has the same contrast characteristic as the embodiments of the present invention. However, there is a phenomenon that the front color characteristic deteriorates as shown in FIG. 9. That is, in the comparative example, an optical axis separation angle is widely distributed and a variation in color characteristic shown in FIG. 9 is Δv>0.2 and Δu>0.03, which is larger than those shown in FIGS. 5 and 7. Line 1 varies depending on a viewing angle.

The reason why the color coordinate is shifted is supposed because the negative O film was used. That is, in the negative O film, discotic liquid crystal is used as the liquid crystal included in the O film. As described above, the discotic liquid crystal is more unlikely to be aligned in an alignment axis, compared with nematic liquid crystal used in a positive O film. As a result, an optical axis separation angle occurs.

INDUSTRIAL APPLICABILITY

Accordingly, the comparative example using the negative O film has a color characteristic inferior to the embodiments of the present invention.

As described above, an integrated O film according to the present invention is manufactured by laminating a positive O film and a negative B film under an optimal condition. Accordingly, it is possible to prevent light leakage in all directions and to manufacture a TN-LCD capable of improving a contrast characteristic, gray scale characteristic and color characteristic by using the integrated O film according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A polarizer plate comprising:
a polarization film; and
an integrated O film laminated on the polarization film,
wherein the integrated O film includes a negative B film, an alignment film laminated on the negative B film and positive O film, which is formed by coating and curing nematic liquid crystal and laminated on the alignment film, and
wherein an in-plane optical axes of the polarization film and the negative B film are orthogonal to each other,
wherein an average tilt angle of the positive O film expressed by Equation 11 is 30° to 50° and a maximum value of the tilt angle is 50° to 90°, $$\theta_{average} = \frac{\int_0^d \theta(z)dz}{d} \qquad \text{Equation 11}$$

where, d denotes a thickness of the film and θ(z) denotes a tilt angle of the film in a vertical position z.

2. The polarizer plate according to claim 1, wherein an in-plane retardation value of the negative B film is 150 to 250 nm.

3. The polarizer plate according to claim 2, wherein, a value $N_z$ of the negative B film expressed by Equation 10 is 0.1 to 2

$$N_z = \left|\left(\frac{n_z - n_y}{n_x - n_y}\right)\right| \qquad \text{Equation 10}$$

where, $n_x$, $n_y$, and $n_z$ denote refractive indexes of x, y and z directions, respectively.

4. A twisted nematic liquid crystal display (TN-LCD) comprising:
a pair of glass plates which face each other;
twisted nematic liquid crystal filled between the glass plates; and
polarizer plates attached to the outsides of the glass plates,
wherein each of the polarizer plates include a polarization film and an integrated O film laminated on the polarization film,
wherein the integrated O film includes a negative B film, an alignment film laminated on the negative B film and positive O film, which is formed by coating and curing nematic liquid crystal and laminated on the alignment film, and wherein in-plane optical axes of the polarization film and the negative B film are orthogonal to each other.
wherein an average tilt angle of the positive O film expressed by Equation 11 is 30° to 50° and a maximum value of the tilt angle is 50° to 90°, $$\theta_{average} = \frac{\int_0^d \theta(z)dz}{d} \qquad \text{Equation 11}$$

where, d denotes a thickness of the film and θ(z) denotes a tilt angle of the film in a vertical position z.

5. The TN-LCD according to claim 4, wherein an in-plane retardation value of the negative B film is 150 to 250 nm.

6. The TN-LCD according to claim 5, wherein, a value $N_z$ of the negative B film expressed by Equation 12 is 0.1 to 2

$$N_z = \left|\left(\frac{n_z - n_y}{n_x - n_y}\right)\right| \qquad \text{Equation 12}$$

where, $n_x$, $n_y$, and $n_z$ denote refractive indexes of x, y and z directions, respectively.

* * * * *